(12) United States Patent
Tarabbia et al.

(10) Patent No.: US 9,026,977 B2
(45) Date of Patent: May 5, 2015

(54) POWER RAIL LAYOUT FOR DENSE STANDARD CELL LIBRARY

(71) Applicant: GLOBALFOUNDRIES Inc., Grand Cayman (KY)

(72) Inventors: Marc Tarabbia, Pleasant Valley, NY (US); Norman Chen, Poughkeepsie, NY (US); Jian Liu, Clifton Park, NY (US); Nader Magdy Hindawy, Wappingers Falls, NY (US); Tuhin Guha Neogi, Clifton Park, NY (US); Mahbub Rashed, Cupertino, CA (US); Anurag Mittal, Wappingers Falls, NY (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 69 days.

(21) Appl. No.: 13/968,850

(22) Filed: Aug. 16, 2013

(65) Prior Publication Data
US 2015/0052494 A1 Feb. 19, 2015

(51) Int. Cl.
*G06F 9/455* (2006.01)
*G06F 17/50* (2006.01)

(52) U.S. Cl.
CPC ........ *G06F 17/5077* (2013.01); *G06F 2217/06* (2013.01)

(58) Field of Classification Search
USPC ........... 716/119, 120, 126, 133, 135; 327/565
See application file for complete search history.

(56) References Cited

U.S. PATENT DOCUMENTS

| 8,129,216 | B2 | 3/2012 | Eickelmann et al. |
| 8,423,946 | B1 * | 4/2013 | Jin et al. ........................ 716/133 |
| 2005/0229141 | A1 | 10/2005 | Kawa et al. |
| 2008/0282216 | A1 | 11/2008 | Bansal |
| 2012/0286858 | A1 * | 11/2012 | Biggs et al. ................... 327/565 |
| 2014/0195997 | A1 * | 7/2014 | Tseng et al. .................. 716/122 |

* cited by examiner

*Primary Examiner* — Brian Ngo
(74) *Attorney, Agent, or Firm* — Heslin Rothenberg Farley & Mesiti P.C.; Victor A. Cardona, Esq.

(57) ABSTRACT

A method includes electrically connecting a plurality of cells of a standard cell library to a power rail. A contact area is deposited to connect a first active area and a second active area of a cell of a plurality cells. The first area and the second area are located on opposite sides of the rail and electrically connected to different drains. The contact area is electrically connected to the power rail using a via. The contact area is masked to remove a portion of the contact area to electrically separate the first active are from the second active area.

6 Claims, 7 Drawing Sheets

US 9,026,977 B2

POWER RAIL LAYOUT FOR DENSE STANDARD CELL LIBRARY

FIELD OF THE INVENTION

The present invention generally relates to semiconductor devices and methods of fabricating semiconductor devices, and more particularly, to methods of fabricating semiconductor devices using standard semiconductor cell fabrication.

BACKGROUND OF THE INVENTION

Standard semiconductor cell fabrication is a method for designing integrated circuits for specific applications. Circuits are designed based on the desired functions using cells from a cell library which are combined and constructed by a placement tool to result in the desired circuits. Standard semiconductor cell library performance is limited by the current a transistor of a cell can deliver. This is proportional to the width of the transistor so it is desirable to enable the transistor to be as wide as possible in a standard cell to deliver high performance circuits.

A typical standard cell loses some active area in two regions including the power rail and the center of the cell where signal connection is performed. In FINFET technologies where the pitch of the FIN is usually fixed, the width of the power rail must be able to fit within a small number of FIN to limit the performance loss when a whole FIN is lost.

Accordingly, a need exists for improved systems and methods for minimizing the area loss in the power rail for high density standard cell for planar and FINFET integrations.

BRIEF SUMMARY

The shortcomings of the prior art are overcome and advantages are provided through the provision, in one aspect, of a method which includes electrically connecting a plurality of cells of a standard cell library to a power rail. A contact area is deposited to connect a first active area and a second active area of a cell of the plurality cells. The first area and the second area are located on opposite sides of the rail and electrically connected to different drains. The contact area is electrically connected to the power rail using a via. The contact area is masked to remove a portion of the contact area to electrically separate the first active area from the second active area.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions, and/or arrangements within the spirit and/or scope of the underlying inventive concepts will be apparent to those skilled in the art from this disclosure.

Figure 1:
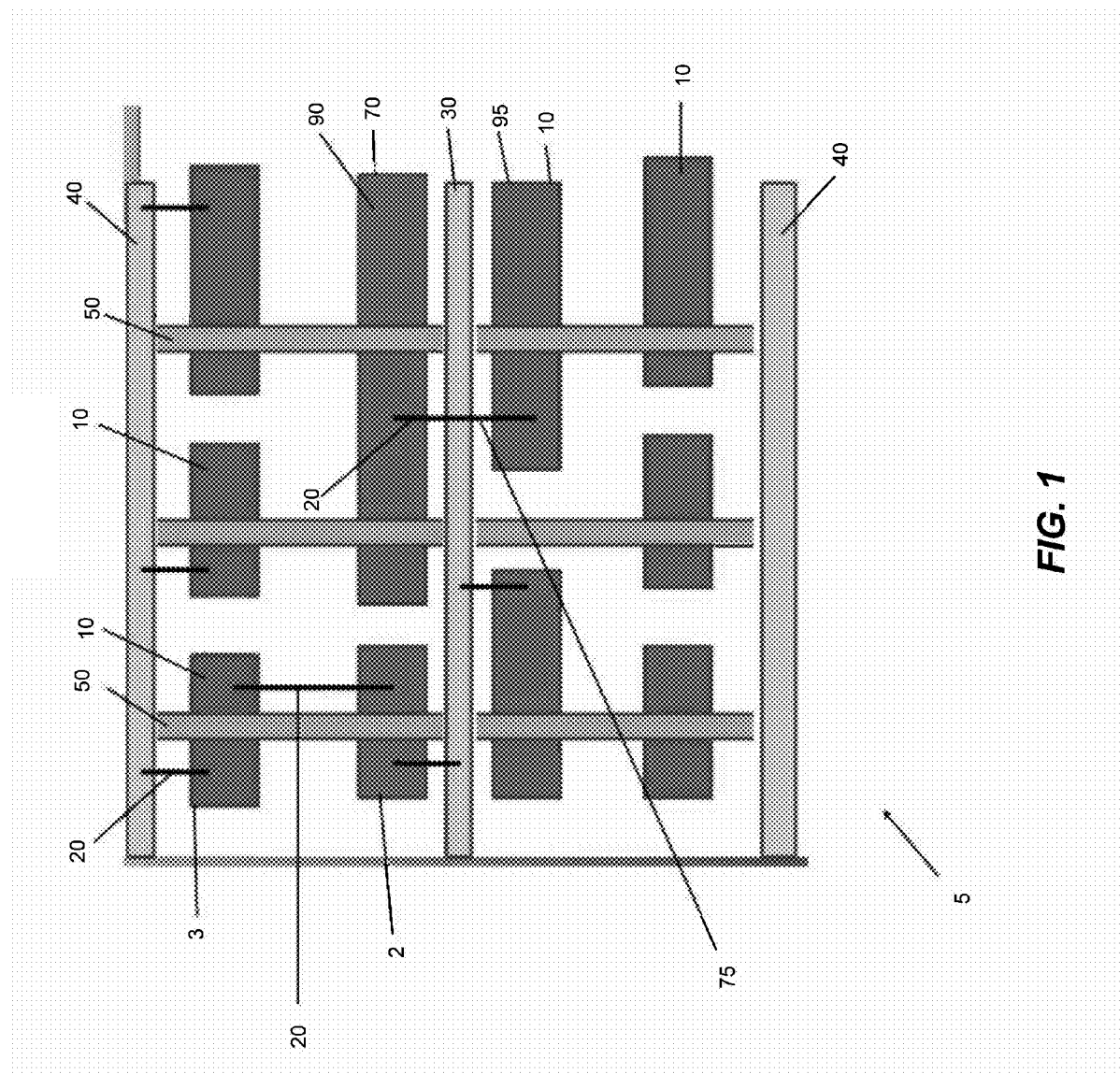
FIG. 1 is a block diagram of a portion of a FINFET standard cell layout.

A schematic diagram of an example of a portion 5 of a FINFET standard cell layout includes active areas 10 (e.g., positive or negative metal oxide semiconductors) is depicted in FIG. 1. Each cell or multiple cells together may perform a particular function in a semiconductor device. Active areas 10, such as a NMOS 2 and a PMOS 3, may be connected to each other by connectors 20 and the active areas may be connected to a voltage source or current source or ground or power rail 30 while active areas on opposite sides of power rail 30 may be electrically connected to corresponding voltage drains 40 on such opposite sides of the power rail. Gates 50 may regulate conductivity through portion 5 of the standard cell layout.

As indicated above, it is desirable to maximize the amount of active areas 10 in a standard cell to maximize the performance of the cell. The proximity of the active areas to the power rail may also cause problems with undesired electrical connection between the rail and particular active areas such that the active areas may be placed at a distance to guarantee reliable isolation from the power rail to avoid any undesired electrical connection, as well as reduce vertical capacitance, between a particular active area, for example a first area 70, and power rail 30, for example. Optical limitations in prior art methods and devices also forced spaces between such contact areas to be larger than desired and therefore active areas, sources, and drains to also be spaced accordingly.

Figure 2:
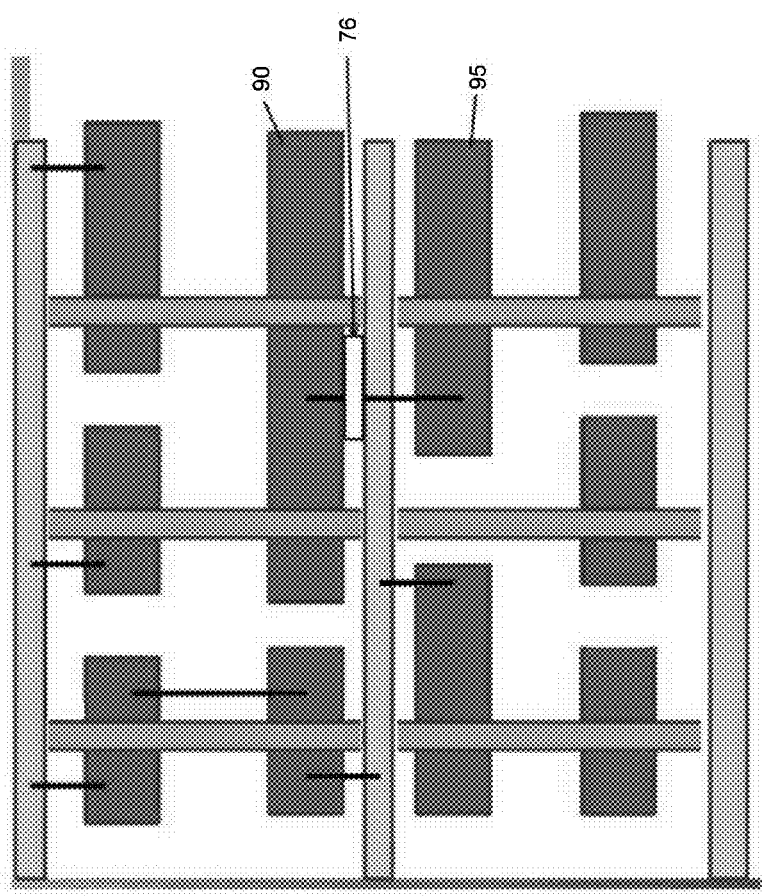
FIG. 2 is another example of a FINFET standard cell layout showing a portion of the layout being masked.
Figure 3:
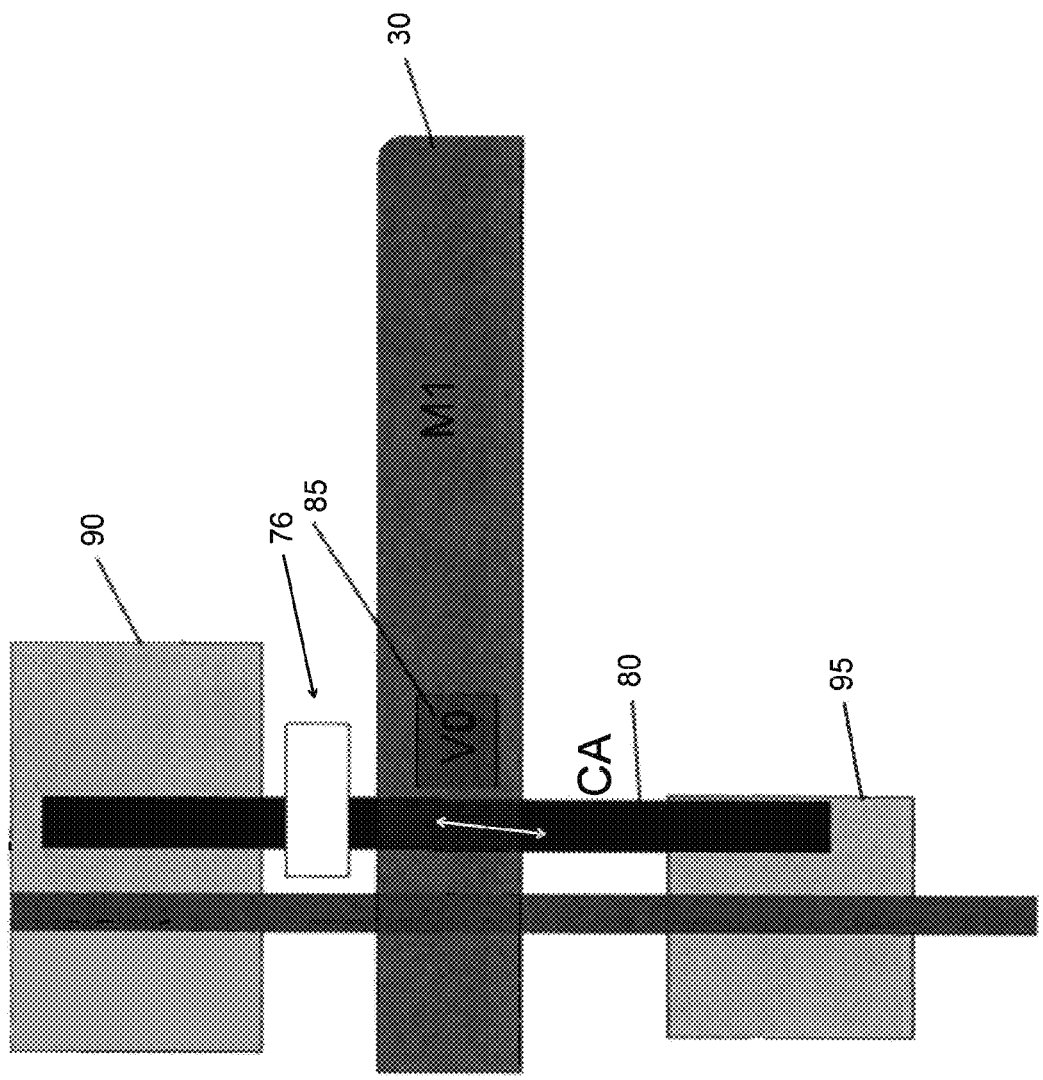
FIG. 3 is a close-up view of a portion of FIG. 2.
Figure 4:
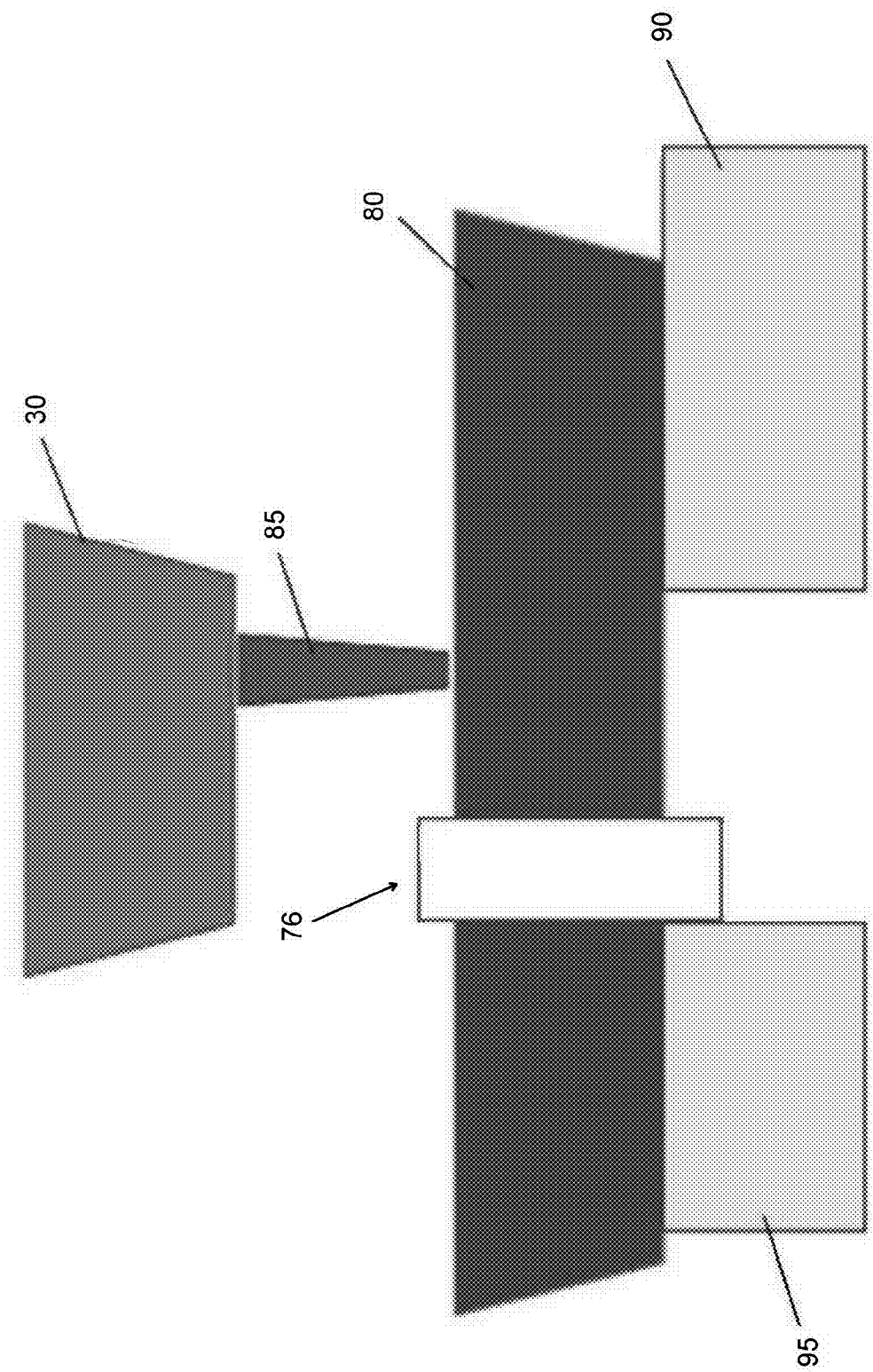
FIG. 4 is a side view of FIG. 3.

In one example depicted in FIGS. 2-4, which utilizes the same numerals for the same elements as in FIG. 1, a CACUT mask may be utilized to cut a first portion 75 of a contact area 80 of one of connectors 20. As depicted in these figures, contact area 80 may be connected to power rail 30 by a via 85. The removal of first portion 75 from contact area 80 results in a cut 76 that facilitates the placement of active areas 10 by allowing the active areas to be initially placed closer to one another due to the later removal of first portion 75 which would otherwise cause electric connection between a first active area 90 and a second active area 95 via power rail 30, with the opposing active areas located on opposite sides of power rail 30 as depicted. Thus, the density of the active areas may be maximized by the removal of first portion 75 after the placement of the active areas and electrical connectors 20 including contact area 80.

Previously, the width of a power rail (e.g., power rail 30) was limited by the capability of landing a V0 (e.g., via 85) on a CA (e.g., contact area 80) and the CA tip-to-tip spacing. Further, the use of a such a mask as described above may bring CA tip to tip spacing to a smaller value than a single mask could print (e.g., a range of 25-50 nm on silicon). Also, this use of a such a mask allows random abutment of cells sharing the same power rail node, and using the mask in the middle of a cell enables small CA tip to tip space and CA to CB spacing, where CB is a different contact used for contacting the gate on the—shallow trench isolations (STI). Because CB is over the STI, reducing the space CA to CB allows an increase in the width of the active portions and an increase in the performance of the standard cell. The described CACUT mask also helps also reduce the spacing between facing contacts from cells sharing a same power rail, thereby increasing an available active area and a performance of the cell.

Figure 5:
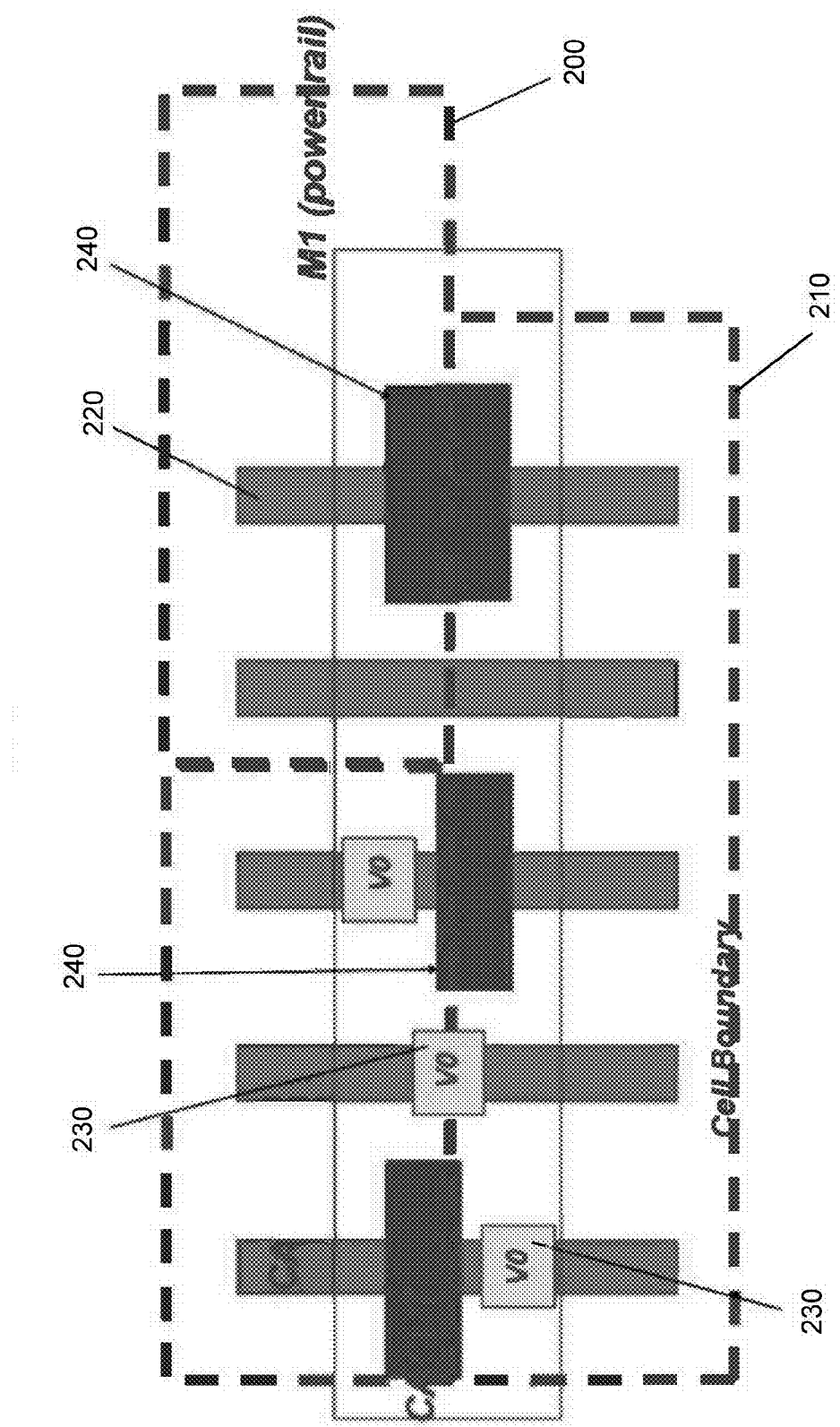
FIG. 5 is a block diagram view of a plurality of cuts made by a mask to a portion of a standard cell layout with the active areas being omitted for clarity.
Figure 6:
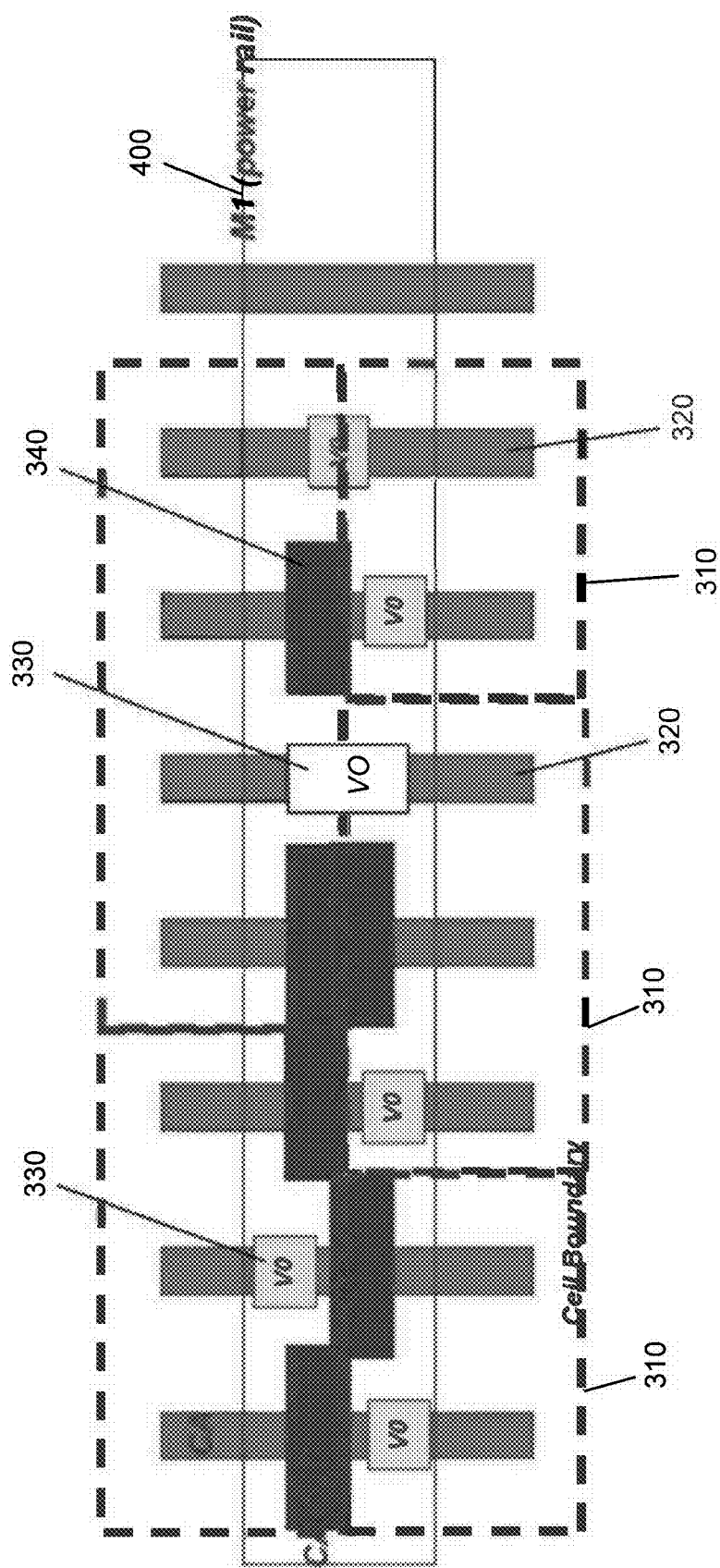
FIG. 6 depicts a block diagram view of an example of a standard cell layout with a plurality of cuts made to a plurality of contact areas in a zigzag manner with the active areas being omitted for clarity.

The standard cells described above may be placed by a placement tool in any abutment configuration to locate the active areas such that it may be desirable to utilize the CACUT mask to remove a portion of the contact area at various locations as depicted in FIG. 5, which depicts a power rail 200, a cell boundary 210, and contact areas 220. Vias 230 for connection from the power rail to active areas are also depicted in FIG. 5 with such active areas not being depicted for clarification purposes. Openings 240 are created in various portions of the contact areas connected to power rail 200 by a mask (e.g., a CACUT mask) based on the location of the active areas relative to the power rail. As depicted in FIG. 6, the abutment of a plurality of standard cells located together in a cell boundaries 310 having active areas (not shown) may result in a zig zag pattern of openings 340 created by a mask in a contact area 320 along a rail 400.

Figure 7:
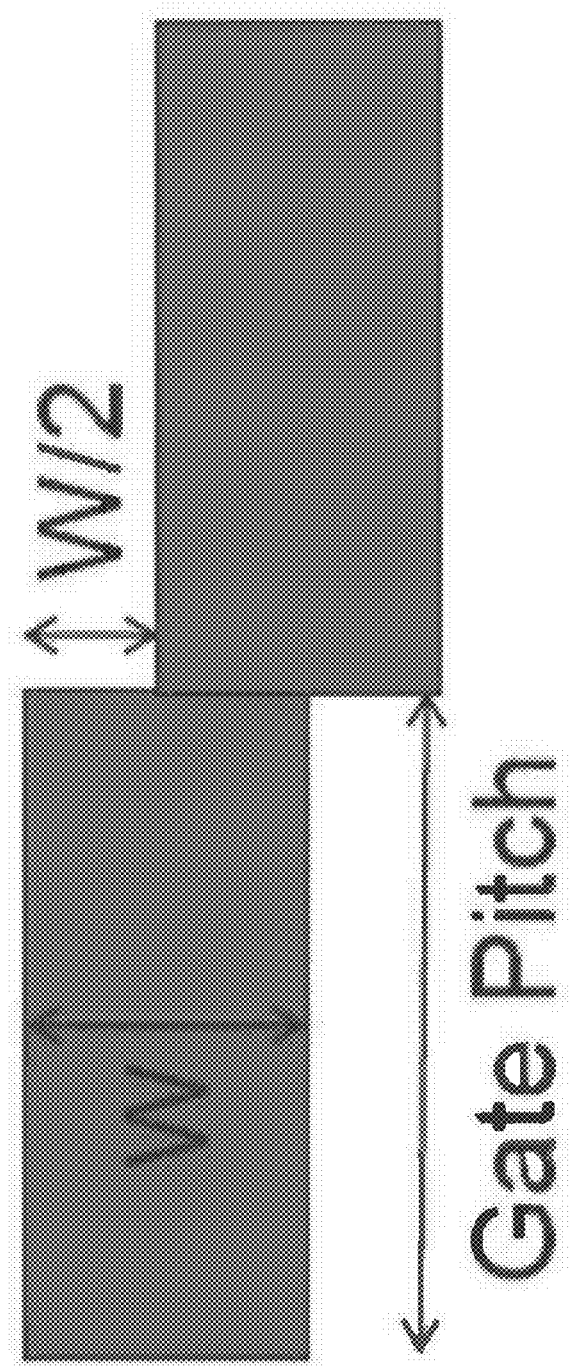
FIG. 7 depicts a block diagram view of an optimal zigzag layout for a standard cell layout as depicted in FIG. 6.

As depicted in FIG. 7 an optimal CACUT layout for the zigzag depicted in FIG. 6 may include:

W=minimum possible by litho (30-60 nm with 193 nm wavelength).

Minimum Gate pitch is between 70 & 110 nm for 193 nm wavelength

Minimum M1 Power Rail width: (1.5x–2.5x W) to properly connect M1 (i.e. power rail 44) to V0 (i.e., vias 330) to CA (i.e., contact areas 320).

In one example, by minimizing the power rail, enough space may be provided (e.g., >150 nm) to use the CACUT mask inside the cell without damaging delicate printing capability in the power rail. Further, using a CACUT mask as described above to create a zig zag pattern may connect a contact area (e.g., contact area 80) to a power rail (e.g., power rail 30) with reasonable power rail width (e.g., between 64 nm and 128 nm wide) to be able to drive enough current with reliable electromigration capability. Also, the use of the CACUT mask provides better dimensional uniformity than contact area double patterning dimensional uniformity at the tip thereof and also the use of the CACUT mask reduces the edge tolerance between CACUT and other CA or CB in comparison to a two contact area mask approach.

Further, by placing a FIN around the power rail (e.g., power rail 30), the FIN Loss at the power rail may be minimized (e.g., to 2) for a single mask definition the active Fin area. Also by using a CACUT mask, as described above, the tip of the contact area may be perpendicular to the contact area (e.g., instead of being rounded), thereby helping a via contacting area. The Via may connects the contact to the low resistance above metal biased at the supply voltage or ground.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method, comprising:
electrically connecting a plurality of cells of a standard cell library to a power rail;
depositing a contact area to connect a first active area and a second active area of a cell of the plurality of cells, the first area and the second area located on opposite sides of the power rail and electrically connected to different drains;
electrically connecting the contact area to the power rail using a via; and
masking the contact area using a CACUT mask to remove a portion of the contact area to electrically separate the first active area from the second active area;
wherein the portion comprises a first portion removed by the masking and the contact area comprises a first contact area of a plurality of contact areas electrically connected to the power rail and further comprising masking the plurality of contact areas to form a zig zag pattern in the plurality of contact areas relative to the longitudinal dimension of the power rail.

2. The method of claim 1 further comprising masking a second contact area connecting a third active area and a fourth active area to remove a second portion of the second contact area.

3. The method of claim 2 wherein the contact area and the second contact area are offset from each other relative to a longitudinal dimension of the power rail.

4. The method of claim 3 further comprising masking a third contact area connecting a fifth active area and a sixth active area such that the contact area, the second contact area, and the third contact area form a zig zag pattern relative to the longitudinal dimension of the power rail.

5. The method of claim 4 wherein the power rail has a width of less than 128 nm.

6. The method of claim 1 wherein a tip of the contact area is perpendicular relative to a remainder of the contact area.

* * * * *